US012217573B2

(12) United States Patent
Mourad

(10) Patent No.: US 12,217,573 B2
(45) Date of Patent: Feb. 4, 2025

(54) METHOD AND APPARATUS OF PLAYING A GAME USING THE ALPHABETIC LETTERS

(71) Applicant: Raphael Mourad, Toronto (CA)

(72) Inventor: Raphael Mourad, Toronto (CA)

( * ) Notice: Subject to any disclaimer, the term of this patent is extended or adjusted under 35 U.S.C. 154(b) by 123 days.

(21) Appl. No.: 16/350,333

(22) Filed: Nov. 5, 2018

(65) Prior Publication Data

US 2019/0172319 A1 Jun. 6, 2019

Related U.S. Application Data

(60) Provisional application No. 62/708,081, filed on Dec. 1, 2017.

(51) Int. Cl.
*G07F 17/34* (2006.01)
*G07F 17/32* (2006.01)

(52) U.S. Cl.
CPC ...... *G07F 17/3288* (2013.01); *G07F 17/3211* (2013.01); *G07F 17/3225* (2013.01); *G07F 17/3293* (2013.01); *G07F 17/3262* (2013.01); *G07F 17/34* (2013.01)

(58) Field of Classification Search
CPC ............. G07F 17/3288; G07F 17/3211; G07F 17/3225; G07F 17/3293; G07F 17/3262; G07F 17/34
See application file for complete search history.

(56) References Cited

U.S. PATENT DOCUMENTS

| | | | | | |
|---|---|---|---|---|---|
| 1,377,327 | A * | 5/1921 | Ebert | A63F 1/02 | 273/299 |
| 4,219,197 | A * | 8/1980 | Acuff | A63F 1/02 | 273/146 |
| 4,836,553 | A * | 6/1989 | Suttle | A63F 1/00 | 273/274 |
| 5,417,432 | A * | 5/1995 | Dwyer | A63F 1/02 | 273/299 |
| 5,556,102 | A * | 9/1996 | Huang | A63F 3/0423 | 273/299 |
| 5,653,444 | A * | 8/1997 | Dahl | A63F 3/00157 | 273/274 |
| 6,234,486 | B1 * | 5/2001 | Wallice | A63F 1/00 | 273/272 |

(Continued)

*Primary Examiner* — Omkar A Deodhar
*Assistant Examiner* — Shauna-Kay Hall
(74) *Attorney, Agent, or Firm* — Fishman Stewart PLLC

(57) ABSTRACT

Methods of playing a game using a single set or multiple sets of entities, each set comprising of the twenty six alphabetic letters, twenty one consonants and five vowels, and may include one or more wild letters. Each participant receives one or more entities to form a "Hand" (combination) or an "Outcome" (permutation). All the combinations or permutations are identified, listed in libraries and ranked within a defined ranking system. In a preferred embodiment, the ranking system consists of seven categories, G to A, from highest to lowest, with further refinement, sub-ranking or re-classification within each category. Furthermore, since the present disclosure uses well-established probabilistic evaluation, it provides a method for ranking combinations or permutations of different number of entities. The game is presented to be played in social encounters, and in particular to be played in gambling establishments, either in a table game setup or in a single or multi-player electronic system.

22 Claims, 8 Drawing Sheets

(56) References Cited

U.S. PATENT DOCUMENTS

| | | | | |
|---|---|---|---|---|
| 7,182,344 | B2 * | 2/2007 | Bloom | A63F 1/04 273/299 |
| 2003/0234493 | A1 * | 12/2003 | Frieman | A63F 1/02 273/296 |
| 2005/0035549 | A1 * | 2/2005 | Zeng | A63F 9/0098 273/299 |
| 2005/0179205 | A1 * | 8/2005 | Bloom | A63F 3/00157 273/272 |
| 2005/0250575 | A1 * | 11/2005 | Kane | G07F 17/32 463/17 |
| 2006/0125181 | A1 * | 6/2006 | Malone | A63F 1/00 273/292 |
| 2006/0192335 | A1 * | 8/2006 | Brodie | A63F 1/00 273/292 |
| 2007/0194531 | A1 * | 8/2007 | Fujka | A63F 1/00 273/299 |
| 2008/0311546 | A1 * | 12/2008 | Wang | G09B 19/22 434/129 |
| 2010/0283207 | A1 * | 11/2010 | Dokic | A63F 1/02 273/299 |
| 2017/0053479 | A1 * | 2/2017 | Manning | G07F 17/3225 |

* cited by examiner

| RANKING | COMBINATION DESCRIPTION |
|---|---|
| A | ALL THE LETTERS ARE CONSONENTS, EXCLUDING THE WORDS IN RANKING F. |
| B | ALL THE LETTERS DO NOT FORM A COMBINATION ESTABLISHED IN RANKINGS C, D, E, F OR G. |
| C | ESTABLISHED WORDS, WITH AT LEAST ONE VOWEL, EXCLUDING NAMES IN RANKING D. |
| D | ESTABLISHED NAMES |
| E | ALL THE LETTERS ARE VOWELS |
| F | ESTABLISHED WORDS FORMED BY CONSONENTS ONLY |
| G | ESTABLISHED WILD WORD OR PLAYER'S CHOICE OF A COMBINATION |

FIG. 3

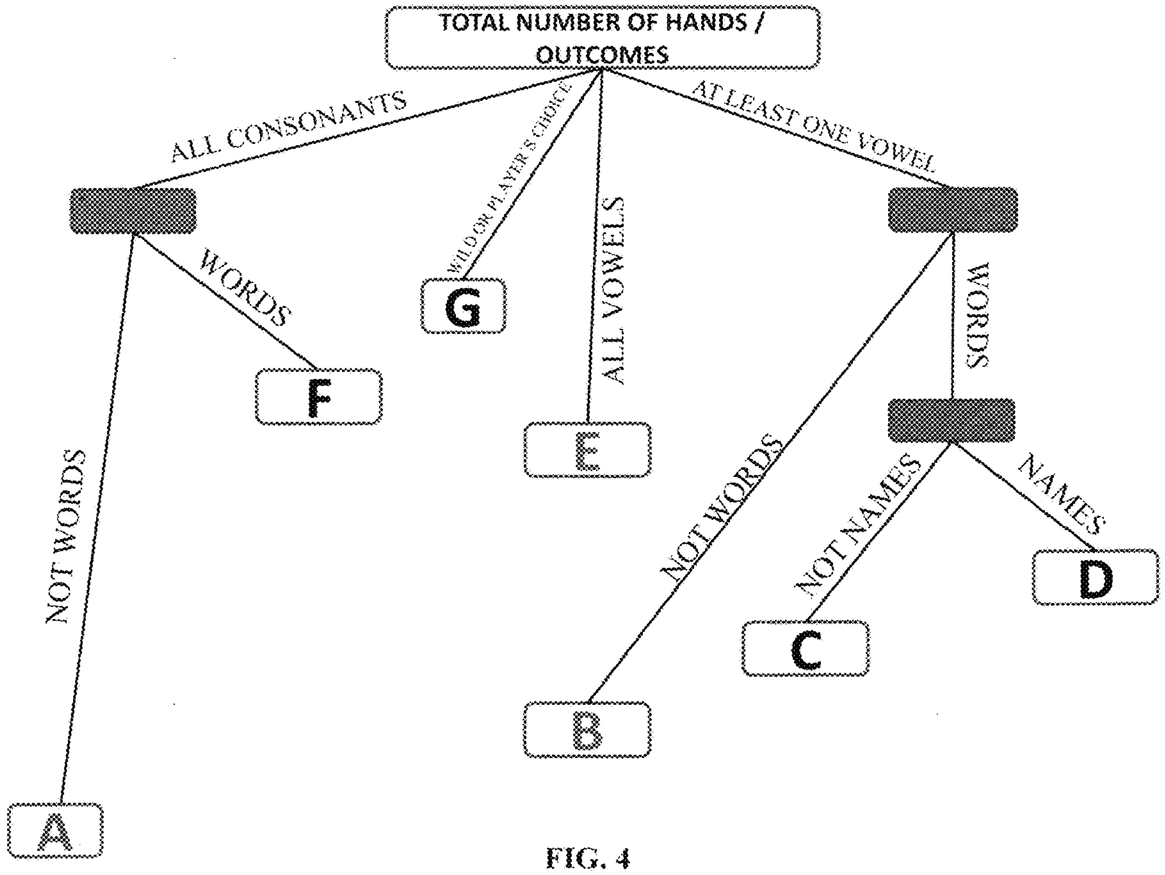

FIG. 4

| RANKING | COMBINATION DESCRIPTION | COMBINATIONS | LIST OF WORDS |
|---|---|---|---|
| A | ALL THE LETTERS IN HAND ARE CONSONENTS, EXCLUDING THE WORDS IN RANKING F. | 208 | (LISTED IN LIBRARY) |
| B | ALL THE LETTERS IN HAND DO NOT COMBINE TO ESTABLISHED WORDS IN RANKINGS C, D, E, F OR G | 61 | (LISTED IN LIBRARY) |
| C | ESTABLISHED WORDS BUT NOT NAMES IN RANKING D | 30 | AM, AN, AS, AT, AX, BE, BI, DO, EX, GO, HE, HI, IF, IN, IS, IT, ME, NO, OF, OK, OR, OX, OY, PA, PI, SO, TO, UP, US, WE. |
| D | ESTABLISHED NAMES | 14 | AB, AL. BO, DI, ED, JO, KI, LI, LO, LU, MO, PO, VI, ZO |
| E | ALL THE LETTERS ARE VOWELS | 10 | A&E, A&I, A&O, A&U, E&I, E&O, E&U, I&O, I&U, O&U |
| F | ESTABLISHED WORDS FORMED BY CONSONENTS ONLY | 2 | BY, MY |
| G | ESTABLISHED WILD WORD OR PLAYER'S CHOICE OF COMBINATION | 1 | Y & Z OR PLAYER'S CHOICE OF 2 LETTERS (ANY COMBINATION RANKED A) |

FIG. 5

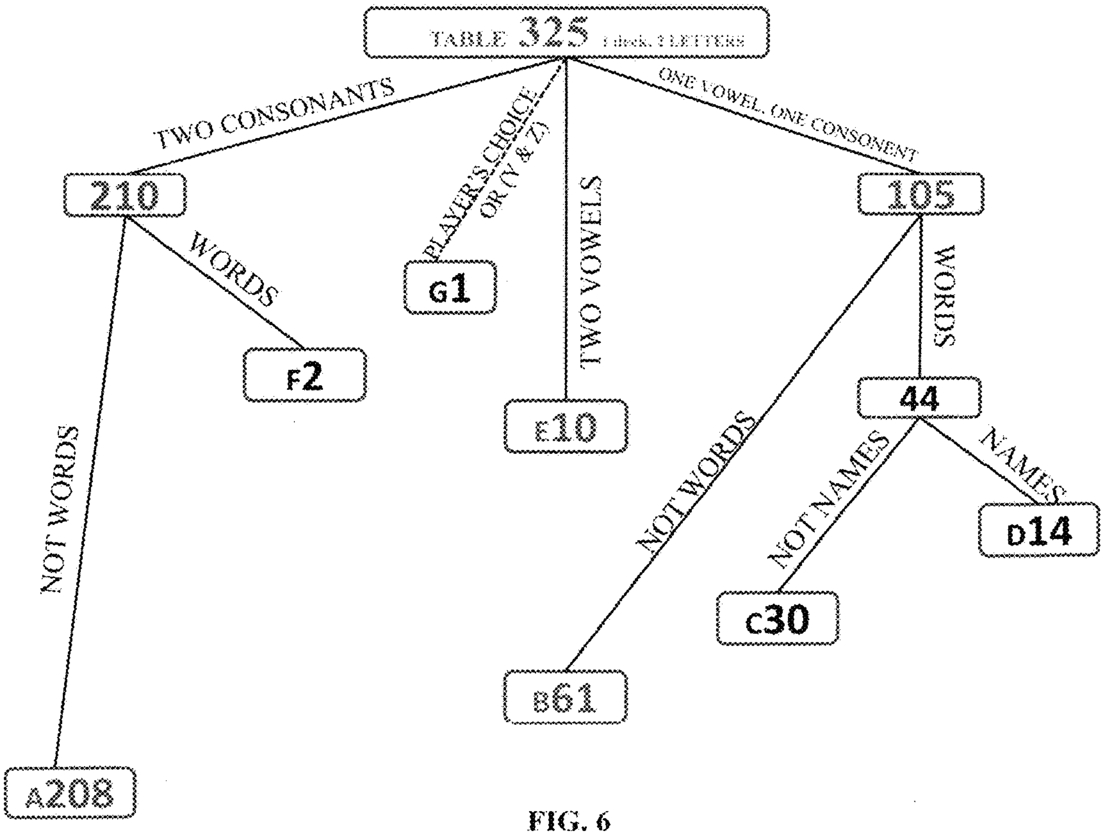

FIG. 6

| RANKING | COMBINATION DESCRIPTION | COMBINATIONS | LIST OF WORDS |
|---|---|---|---|
| A | ALL THE LETTERS IN THE "OUTCOME" ARE CONSONENTS, EXCLUDING THE WORDS IN RANKING F. | 439 | (LISTED IN LIBRARY) |
| B | ALL THE LETTERS IN THE "OUTCOME" DO NOT COMBINE TO ESTABLISHED WORDS IN RANKINGS C, D, E, F OR G | 153 | (LISTED IN LIBRARY) |
| C | ESTABLISHED WORDS BUT NOT NAMES IN RANKING D | 32 | AM, AN, AS, AT, AX, BE, BI, DO, EX, GO, HE, HI, IF, IN, IS, IT, MA, ME, NO, OF, OK, ON, OR, OX, OY, PA, PI, SO, TO, UP, US, WE |
| D | ESTABLISHED NAMES | 25 | AB, AL, BB, BO, CC, CY, DD, DI, ED, EM, HY, JO, KI, LI, LO, LU, MO, PO, RO, SI, SU, TY, VI, YI, ZO |
| E | ALL THE LETTERS ARE VOWELS | 25 | AA, AE, AI, AO, AU, EA, EE, EI, EO, EU, IA, IE, II, IO, IU, OA, OE, OI, OO, OU, UA, UE, UI, UO, UU. |
| F | ESTABLISHED WORDS FORMED BY CONSONENTS ONLY | 2 | BY, MY |
| G | ESTABLISHED WILD WORD OR PLAYER'S CHOICE OF COMBINATION | 1 | YZ OR PLAYER'S CHOICE OF 2 LETTERS (ANY COMBINATION RANKED A) |

FIG. 7

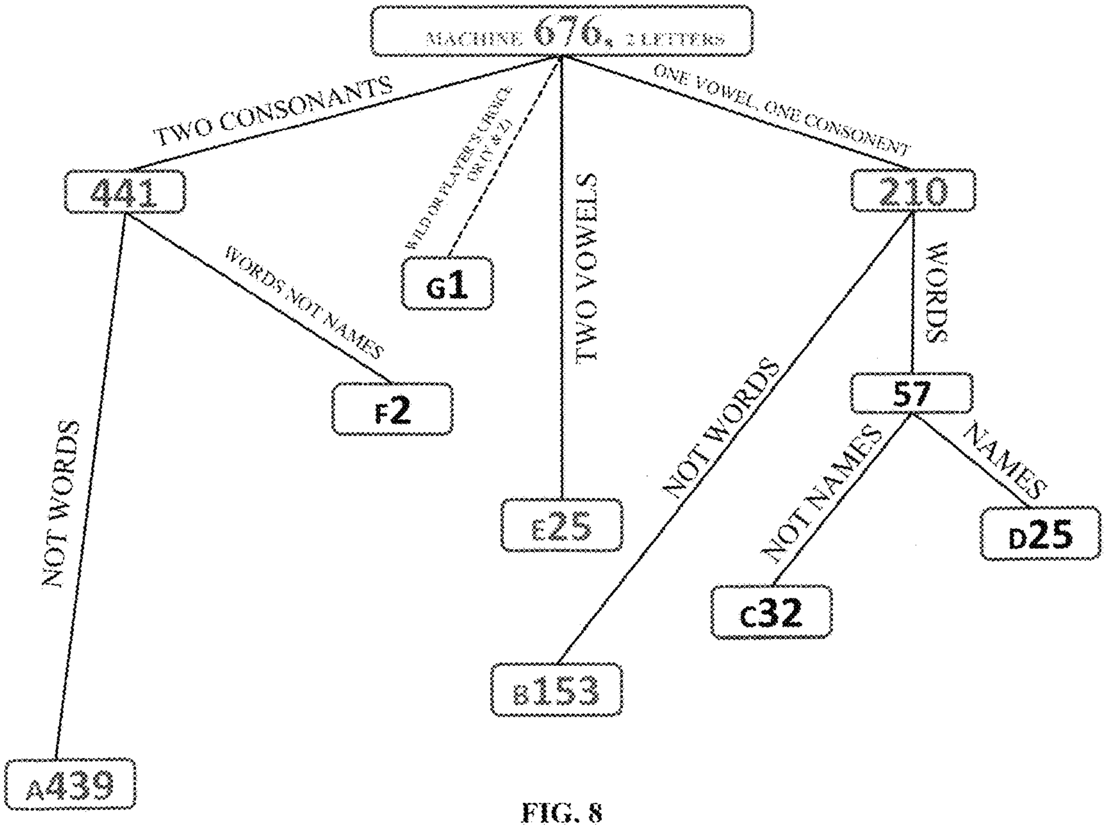

FIG. 8

| RANKING | COMBINATION DESCRIPTION | NUMBER | LIST OF WORDS |
|---|---|---|---|
| A | ALL THE LETTERS IN HAND ARE CONSONENTS, EXCLUDING THE WORDS IN RANKING F. | A+B=1851 | (LISTED IN LIBRARY) A + B = 1851 |
| B | ALL THE LETTERS IN HAND DO NOT COMBINE TO ESTABLISHED WORDS IN RANKINGS C, D, E, F & G | A+B=1851 | (LISTED IN LIBRARY) |
| C | ESTABLISHED WORDS BUT NOT NAMES IN RANKING D | 362 | ACE, AGE, AGO, AID, AIM, AIR, ALE, AND, ANT, ANY, APE, ARE, ARK, ARM, ART, ASK, ATE; BAD, BAG, BAN, BAR, BAS, BAT, BAY, BED, BEG, BEL, BET, BID, BIG, BIN, BIT, BIZ, BOW, BOX, BOY, BUD, BUG, BUM, BUN, BUS, BUT, BUY, BYE; CAB, CAF, CAN, CAP, CAR, CAT, CAY, CEL, CHI, COB, COD, COG, CON, COP, COW, COX, COZ, CUE, CUP, CUT; DAG, DAW, DAY, DEN, DEV, DEW, DEX, DIE, DIG, DIM, DIP, DOE, DOG, DOM, DOT, DOW, DUE, DUG, DUO, DYE; ECO, EGO, ELF, ELK, ELM; FAD, FAN, FAR, FAT, FAV, FAX, FED, FEM, FEU, FEW, FEZ, FIG, FIN, FIT, FIX, FLU, FOB, FOE, FOG, FOH, FOP, FOR, FOU, FOX, FUN, FUR; GAP, GAS, GAY, GEM, GEN, GET, GIN, GOT, GOX, GUM, GUN, GUT; HAD, HAJ, HAM, HAS, HAT, HAY, HEN, HER, HEX, HEY, HID, HIM, HIP, HIS, HIT, HIV, HOG, HON, HOP, HOT, HOW, HUB, HUG, HUN, HUT, HUZ; ICE, ICK, ICY, IFS, INK, ION; JAK, JAM, JAR, JAW, JAZ, JET, JEU, JIG, JOB, JOG, JOY, JUG, JUS, JUV; KEF, KEG, KEV, KEX, KEY, KHA, KID, KIT, KOB; LAB, LAD, LAG, LAH, LAP, LAR, LAS, LAW, LAY, LED, LEG, LET, LID, LIE, LIP, LIT, LOG, LOJ, LOT, LOW, LOX, LUV, LUX; MAD, MAN, MAP, MAT, MAY, MED, MEN, MET, MEW, MIL, MIS, MIX, MIZ, MOB, MOP, MUD; NAG, NAP, NEW, NIL, NIX, NOR, NOT, NUT; OAK, OAT, OHM, OIL, OLD, ONE, OPA, ORE, ORG, OUR, OUT, OWE, OXY; PAD, PAK, PAY, PEN, PER, PET, PEW, PIE, PIG, PIN, POD, POW, POX, PRO, PUB, PUT; RAD, RAG, RAN, RAY, REC, RED, REF, REG, REM, RET, REV, REZ, RIB, RID, RIM, RIP, ROB, ROD, ROT, ROW, RUB, RUE, RUG, RUM, RUN, RYE; SAD, SAN, SAT, SAY, SEA, SEC, SET, SEW, SEX, SHE, SIN, SIP, SIR, SIT, SIX, SKI, SOB, SOD, SOL, SON, SOU, SOW, SOX, SOY, SPA, SUM, SUN; TAG, TAP, TAX, TEN, THE, TIE, TIN, TIP, TIZ, TOE, TOP, TOY, TWO; UPS; VAC, VAN, VAT, VEG, VET, VEX, VIE, VIM, VIN, VIS, VOW; WAG, WAR, WAS, WAX, WAY, WEB, WET, WIG, WIN, WIT, WIZ, WOK, WON, WUD; YEN, YES, YET, YOU, YUK; ZAG, ZAS, ZAX, ZEK, ZIG, ZIN, ZIP. |
| D | ESTABLISHED NAMES | 43 | ABE, ALF, ALI, AVI, AXL; BEN, BEV; COY; DON; ELY, EVA; FAY, FOY; GUY; IAN, IVY; JAX, JAY, JED, JEF, JEP, JIM, JOE, JON; KAY, KEN, KIM; LEN, LEO, LEX, LIZ; MAC, MAX; ORA; REX; SAM, SUE; TED, TIM, TOM; ZED, ZEV, ZOA. |
| E | ALL THE LETTERS ARE VOWELS | 10 | A,E &I, A,E&O, A,E&U, A,I&O, A,I&U, A,O&U, E,I&O, E,I&U, E,O&U, I,O&U |
| F | ESTABLISHED WORDS FORMED BY CONSONENTS ONLY | 10 | CRY, DRY, FLY, FRY, GYM, PLY, SKY, SPY, TRY, WHY |
| G | ESTABLISHED WILD WORD OR PLAYER'S CHOICE | 1/1 | X, Y & Z; V, I & P OR PLAYER'S CHOICE OF 3 LETTERS, (ANY COMBINATION RANKED A OR B) |

FIG. 9

| RANKING | COMBINATION DESCRIPTION | COMBINATIONS | LIST OF WORDS |
|---|---|---|---|
| A | ALL THE LETTERS IN THE OUTCOME ARE CONSONENTS, EXCLUDING THE WORDS IN RANKING F. | A + B = 5035 | (LISTED IN LIBRARY) |
| B | THE OUTCOME INCLUDES 1 OR 2 VOWELS, AND NOT LISTED IN RANKINGS C OR D. | A + B = 5035 | (LISTED IN LIBRARY) |
| C | ESTABLISHED WORDS BUT NOT NAMES IN RANKING D | 966 | (LISTED IN LIBRARY) |
| D | ESTABLISHED NAMES | 185 | (LISTED IN LIBRARY) |
| E | ALL THE LETTERS ARE VOWELS | 125 | AAA, AAE, AAI, AAO, AAU, AEA, AEE, AEI, AEO, AEU, AIA, AIE, AII, AIO, AIU, AOA, AOE, AOI, AOO, AOU, AUA, AUE, AUI, AUO, AUU; EAA, EAE...... |
| F | ESTABLISHED WORDS FORMED BY CONSONENTS ONLY | 33 | BRR, BYS, CRY, CWM, DRY, FLY, FRY, GRR, GYM, GYP, HMM, HYP, MMM, MYC, NTH, PHT, PLY, PRY, PST, PYX, SHY, SKY, SLY, SPY, STY, SYN, THY, TRY, TSK, WYN, WHY, WRY, ZZZ |
| G | ESTABLISHED WILD WORD OR PLAYER'S CHOICE OF COMBINATION | 1 /1 | VIP; XYZ OR PLAYER'S CHOICE OF 3 LETTERS, (ANY COMBINATION RANKED A OR B) |

FIG. 11

*All the outcomes of 3 letters (got from the 2 letters that did not meet the precondition) are not represented in Rankings A to E, as they are listed in the respective libraries.

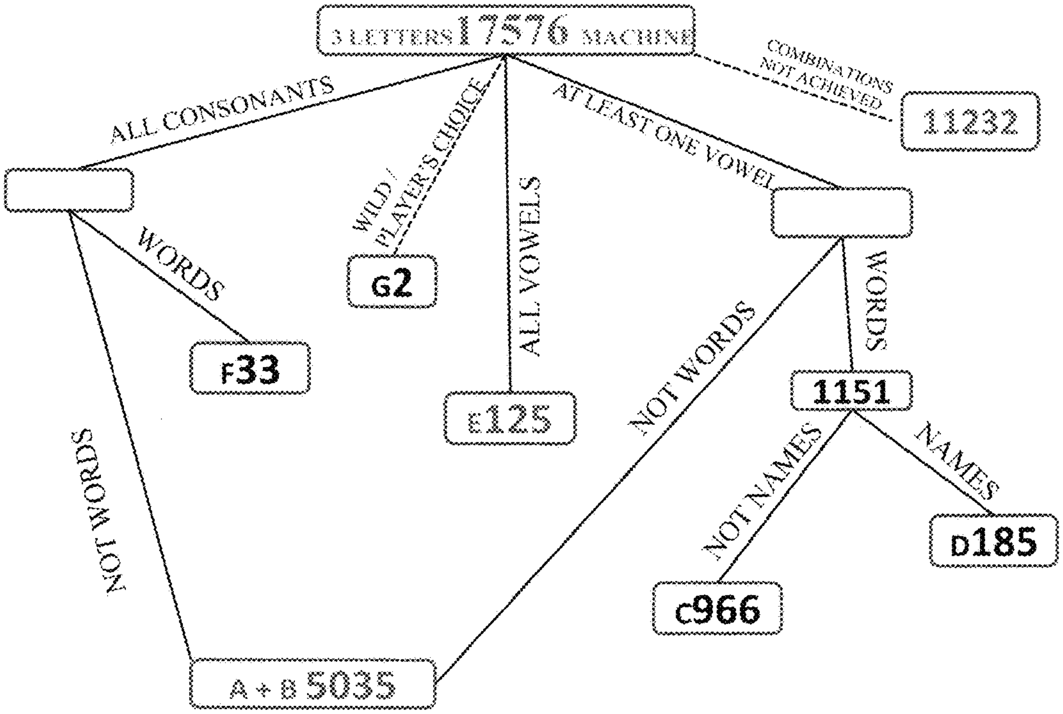

FIG. 12

METHOD AND APPARATUS OF PLAYING A GAME USING THE ALPHABETIC LETTERS

This application claims priority of provisional application No. 62/708,081 filed on Dec. 1, 2017.

FIELD OF THE INVENTION

This invention relates to social or casino games using one or more sets of the 26 alphabetic letters.

BACKGROUND ART

A wide variety of games are known in the gaming industry, including social games and games played at casinos. In general, these games are divided into two main categories; games of pure chance and games with a skill component. Games of pure chance include Yahtzee, Slot or Video Machines, Keno, Roulette, Craps, Baccarat, War, Sic Bo and the Big Wheel. Games with a skill component include Backgammon, Rummy, Canasta, BlackJack and Poker-type games. All these pure chance or skill component games, or variations of them, use set of numbers or symbols on dice, conventional cards, tiles or wheels. Players bet on a single outcome or on combinations of these numbers or symbols. Games that are using the alphabetic letters such as Scrable, Words or Wheel of Fortune are considered as determined word puzzles that player or players attempt to solve them. In these games, players do not make any decision or place a wager but simply use their knowledge and skill to solve a word puzzle. This invention discloses a game of chance in which participants have the opportunity to make a decision, to place a wager, to explore the world of words and be exposed to a great learning experience. The advantageous games of the present disclosure provide games that can be played by players with substantial skill or experience or with almost no skill or experience in the playing of games of this type. The invention discloses a fair, honest and high integrity social or wagering game, that uses one or more sets (or decks) of the 26 alphabetic letters, provides fun, challenge and entertainment to people in social encountering and to casual players in gambling establishments.

SUMMARY OF THE PRESENT DISCLOSURE

The present disclosure provides a new game "WORDY" that can be played at social encountering and in particular, in gaming establishments or casinos, either in table game setups or in single player slot/video machines or in multi-players electronic setups. The present disclosure provides the following advantageous advances to the field of games playing systems and methods:

The game uses one or multiple sets (or decks) of the 26 alphabetic letters A to Z, and may include one or more wild letters, most preferably 1 to 10 sets in social encountering or in table games setups in casinos and an infinite number of sets in a slot/video machine or multi-players electronic setups. In the following, any letter will be interchangeably referred to as an entity, (as the letters can be displayed on reels of a slot/video machine, engraved on dice or tiles, printed on cards or on any other media) and to any combination of two or more letters as a "Hand" in social/Table games and as an "Outcome" in Machines. FIG. 1 shows seven entities, (letters printed on cards), that represent 2, 3 and 4 letter "Hands". FIG. 2 shows a 2 and 3 letter "Outcomes" displayed on a slot machine. "Hands" or "Outcomes" are rated, compared and valued within an established Ranking system.

BRIEF DESCRIPTION OF THE DRAWINGS

So the those having ordinary skill in the art to which the present disclosure pertains will more readily understand how to make and use the subject invention, exemplary embodiments will be described in detail herein below with reference to the drawings, wherein:

FIG. 3 is a Table showing a Ranking system for letters' combinations of "Hands" or "Outcomes";

FIG. 4 is a Chart showing the Ranking system for letters' combinations of "Hands" or "Outcomes";

FIG. 5 is a Table showing an established Library of 2-letter "Hands" using one set (deck) of letters;

FIG. 6 is a Chart showing the Library plan of 2-letter "Hands" using one set (deck) of letters;

FIG. 7 is a Table showing an established Library of 2-letter "Outcomes" using infinite sets of letters;

FIG. 8 is a Chart showing the Library plan of 2-letter "Outcomes" using infinite sets of letters;

FIG. 9 is a Table showing an established Library of 3-letter "Hands" using one set (deck) of letters;

FIG. 11 is a Table showing a Library plan of 3-letter "Outcomes" using infinite sets of letters;

FIG. 12 is a Chart showing the Library plan of 3-letter "Outcomes" using infinite sets of letters;

As an example of an established Ranking system, FIG. 3 and FIG. 4 give a Ranking system of "Hands" or "Outcomes" that applies to any number of sets of entities and to any number of letters. In this example, "Hands and "Outcomes" are ranked into 7 categories, A to G, from lowest to highest. For a specific number of letters, I, and a specific number of sets of entities, S, a library L is set up that includes all the combinations of the I letters and ranked within the said Ranking system. In the said Ranking system, a combination of letters that form an established wild combination (such as Y&Z, X,Y&Z, W,X,Y&Z) or a player's choice of letters (such as BB, SUE, LOVE) is ranked G; a combination of consonants only that form an established word in the respective Library, is ranked F; a combination of vowels only is ranked E; a combination of letters that form an established name in the respective Library, is ranked D; a combination of letters that form an established word in the respective Library, is ranked C; a combination of letters, that constitute of at least one vowel, that is listed in the respective Library, is ranked B and all the other combinations are ranked A. FIG. 5 and FIG. 6 provide the Library and Ranking of "Hands" associated with I=2, S=1 (2 letters combinations and a single set of entities) for social/table games. FIG. 7 and FIG. 8 provide the library and Ranking of "Outcomes" associated with I=2 and infinite number of sets of entities for machines or multi players electronic setups. Every "Hand" with 2 letters is uniquely defined and ranked in FIG. 5 and FIG. 6, and every "Outcome" of 2 letters is uniquely defined and ranked in FIG. 7 and FIG. 8. As noted, the "Hand" consisting of the combination of the two letters O and F is ranked C in FIG. 5, however, in FIG. 7, the "Outcome" OF is ranked C, while the "Outcome" FO is ranked B. The "Hand" consisting of the combination of the two letters B and Y is ranked F in FIG. 5, while in FIG. 7, the "Outcome" BY is ranked F while the "Outcome" YB is ranked A.

Figure 10:
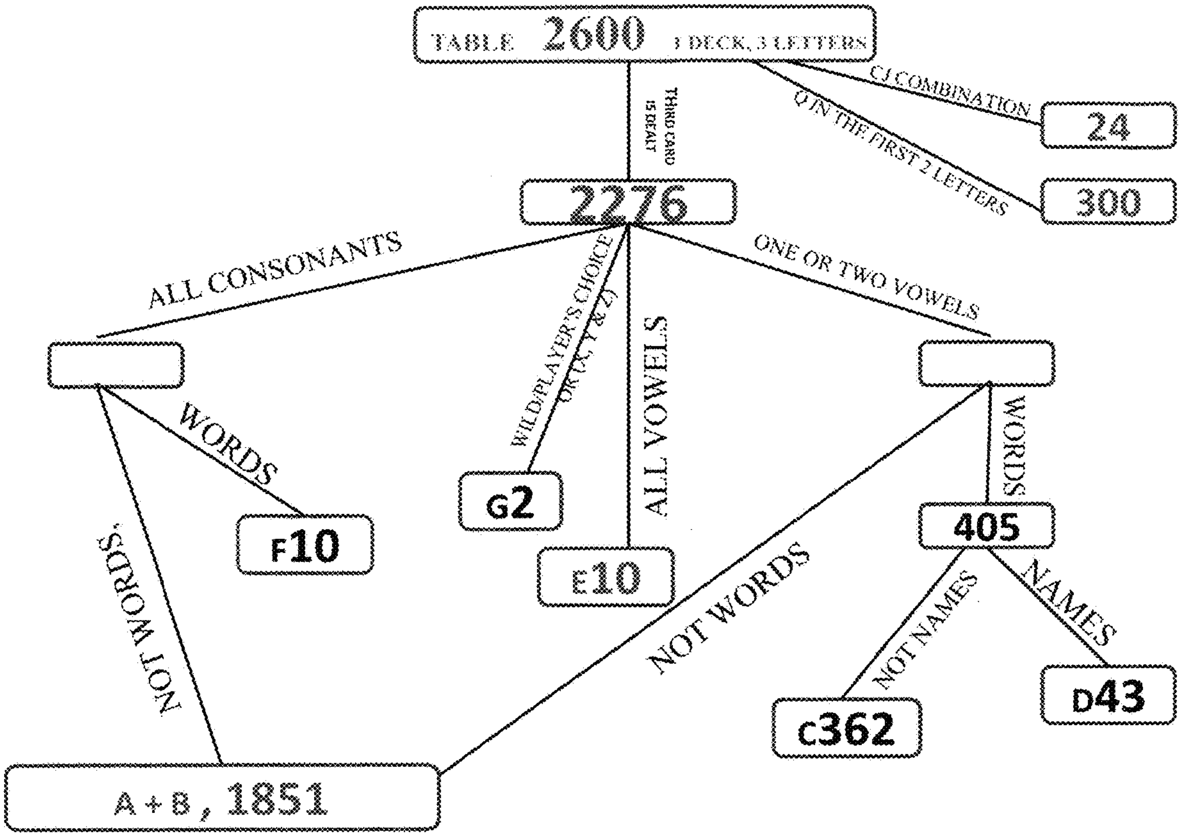
FIG. 10 is a Chart showing the Library plan of 3-letter "Hands" using one set (deck) of letters.

Similarly, FIG. 9 and FIG. 10 were derived and established for the three Letter "Hands" and FIG. 11 and FIG. 12 were derived and established for the three Letter "Outcomes".

Figure 1:
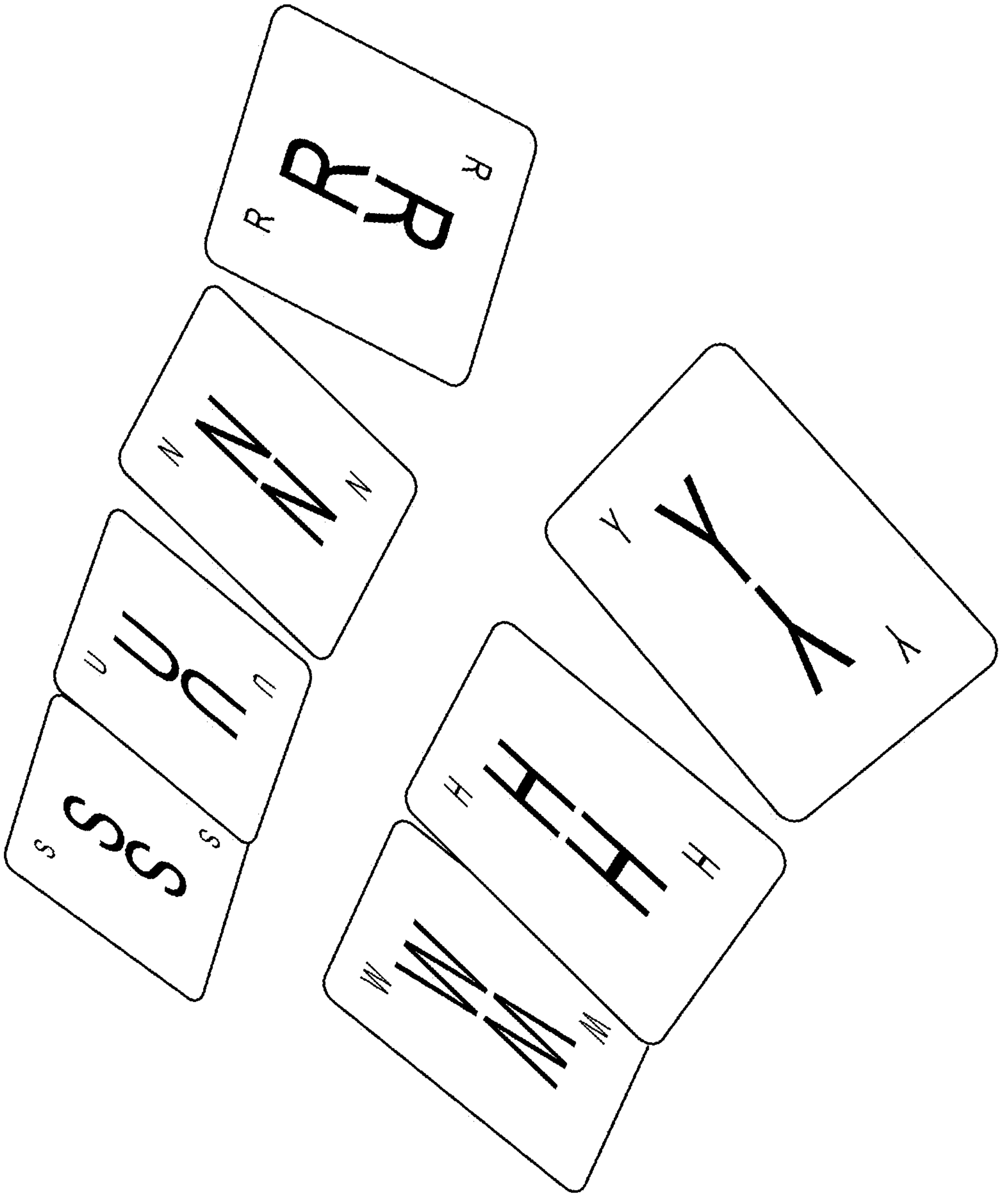
FIG. 1 is a display of letters on cards, showing 2, 3 and 4 letter "Hands"
Figure 2:
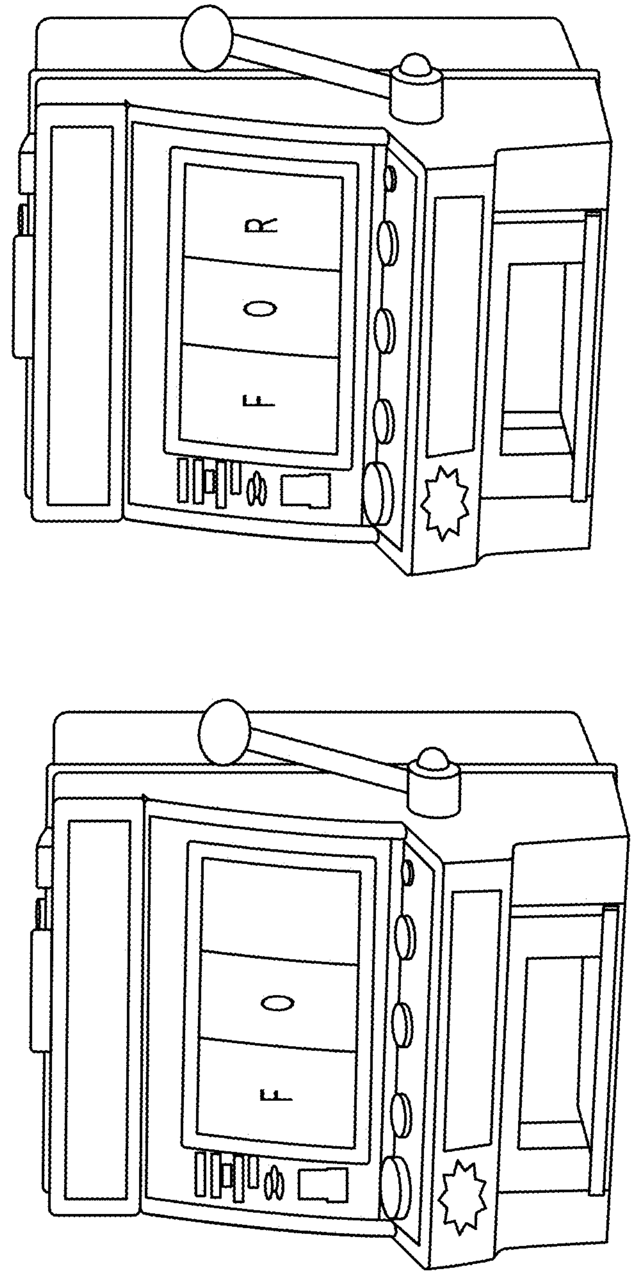
FIG. 2 is a display of letters on a slot/video machine, showing 2 and 3 letter "Outcomes"

The "Hands" and "Outcomes" of FIG. 1 and FIG. 2 are as follow: the 2-letter "Hand", that constitutes of the two letters S & U, is ranked C. The added letter N form together a 3-letter "Hand" (SUN) ranked C, and the added 4th letter R form all together a 4-letter "Hand" (RUNS) is also ranked C. The 2-letter "Hand", that constitutes of the two letters H & W, is ranked A, whereas the added letter Y form together a 3-letter "Hand" (WHY) ranked F. The "Outcome of the first 2-reels, FO, is ranked B, whereas the display of the letter R on the third reel, forms the "Outcome" FOR which is ranked C.

A different Ranking system or a refinement of the above Ranking system can also be applied. The refinement may include a ranking of the alphabetic letters (R is ranked higher than D, but ranked lower than Y) and a ranking of the "Hands" or "Outcomes" within any of the categories A to G. The O-letter combinations O & R and I & S are both ranked C, but under the said refined Ranking system, the combination I & S is higher than the combination O & R, since S is ranked higher than R. The 3-letter combinations C, R, & Y and D, R & Y are both ranked F, but under the said refined ranking system the combination D, R & Y is higher than the combination C, R, & Y, since D is ranked higher than C.

The disclosure clearly passes the section 101 rejection imposed by the court in In Re Smith, 815F3d816, when dealing with a "conventional card game" on the basis that the claims defined an abstract idea analogous to the economic ideas considered in Alice and Bilski. There is nothing economic involved in the invention or in claims 1 and 13 as they do not define a wagering game or employ conventional cards. However, like all contests, such as board games like chess or checkers, or sporting events between teams or multiple parties such as races and poker games, wagers may be based on the result of the contest or of the game. The present invention is applied into three exemplary games; the game being played in social encounters, in gambling establishment, either in a table game setup or in a single or multi-player electronic system.

DETAILED DESCRIPTION OF EXEMPLARY EMBODIMENTS

In an exemplary embodiment, the game "WORDY" can be played at social encounters. At the start of round of play, each participant receives two or more entities and when in turn, a participant can dump, replace or add one or more entities, in trying to improve participant's "Hand" and establish a "Hand" that is highly rated. At any time, and in accordance to the game rules, each participant can stop the round of play by calling it and the winner of the round of play is the one that has the highest "Hand" value. When the round of play is stopped, all the participants "Hands" are compared and a winner is declared. When the comparison is done between two "Hands" of equal number of cards, the comparison is strictly done using the ranking in FIG. 3 or alternatively by using a refined or different Ranking system. When the two "Hands" have different number of entities, then the higher ranking hand is established in accordance to the rules of the game. A two letter "Hand" can be rated lower or higher than a three letter "Hand", pending on the ranking system and the rules of play. Using the Libraries and Ranking system given in FIG. 5 and FIG. 9 for 2 and 3 letters respectively, and the payouts provided in Table 2 and Table 3 one may conclude the following; "2 Letter Hand" ranked G or F is higher than "3 Letter Hand" ranked D or less, "2 Letter Hand" ranked E or D is higher than "3 Letter Hand" ranked C or less, and "2 Letter Hand" ranked C or B is higher than "3 Letter Hand" ranked less than C. As an example, the combination of the two letters B and Y ("2 Letter Hand" ranked F) is higher than the combination of the three letters F, O and R, ("3 Letter Hand" ranked C) but lower than the combination C, R and Y ("3 Letter Hand" ranked F).

Two exemplary embodiments of the game "Wordy", when played in gaming establishments or casinos, in table game and multi players and slot/video machine setups, are given below.

Table Game Setup

In table game setups, the game may have between two and three stages in a round of play. At the start of each round, players place one main wager within the minimum and maximum main wager limits agreed upon or set up by the casino, and one or more side bets, most preferably two to three, each within the minimum and maximum side bet limits agreed upon or set up by the casino.

After wagers have been placed, each player and the dealer receive two entities; the player's letters are facing up, and one of the dealer's letter faces down. The fate of the main wager is associated with the comparison of the player's and dealer's "2 letter Hands" values. The fate of each side bet is associated with the player's "Hand" ranking and value only. After the main wager and the first side bet are settled, player receives a third additional entity if player has placed at the start of the play a second side bet, and if a predetermined condition on the first player's 2 entities is met. If the player has placed a second side bet but the condition is not met, then all wagers beyond the first side bet are totally or partially credited back to the player and the round of play ends.

In any stage of the game, a player who has placed a side bet beyond that stage of the game, and the predetermined condition is met in that stage, player receives an additional entity. If the player has not placed a side bet beyond that stage or the predetermined condition is not met, then the round of game ends, and wagers beyond the said stage, if any, are totally or partially credited back to the player.

In a preferred embodiment, a single set of entities is used, wild letters are not included, and each round consists of two stages; each player places one main wager and two side bets. "Hands" in the first stage consist of two letters combinations and "Hands" in the second stage consist of three letters combinations. The two or three letters combinations are ranked into 7 categories, A to G, from lowest to highest, as provided in FIG. 5 and FIG. 9 respectively. For the first side bet, a 2 letter "Hand" is a winning "Hand" if its ranking is B or higher, and for the second side bet, a 3 letter "Hand" is a winning "Hand" if it is ranked C or higher. The predetermined condition set in this preferred embodiment, is that the player must have a chance to form a winning "3 card hand" by withdrawing an additional third entity. This condition is met unless the 2 letter "Hand" includes the letter Q or consists of the letters C and J.

The fate of the main wager and of the two side bets are assessed as follows:

Players are given the choice, after seeing the dealer's face up letter, whether to lose the main wager and not to play against the dealer, or to double (or triple) the main wager and to play against the dealer. The dealer qualifies to play against the players if dealer's 2 letters "Hand" is rated B or better. A player most likely will decide to play the main wager unless the dealer's face up letter is a vowel and player's "Hand" is ranked A. Player places, therefore, one unit wager in 12.25% of the time (5/26×207/325) and 2 or 3 units in 87.75% of the times, resulting into an average wager of 1.8775 unit and 2.755 unit for doubling and tripling respectively. If the dealer is not qualified to play, (dealer's hand is 2 consonants and not the combinations B & Y or M & Y), dealer returns the main wager and all the adds on to the player. If the dealer is qualified to play, then the dealer compares the ranking of the dealer's "Hand" to the player's "Hand"; If the dealer's "Hand" ranks higher than the player's "Hand", dealer collects the player's main wager and the adds on; if the dealer's "Hand" ranks equally to the player's "Hand", it is a push, and if the dealer's "Hand" ranks lower than the player's "Hand", dealer pays the main wager and the adds on in accordance to Table 1. Using the payouts given in Table 1 below, the Casino Advantage, CA, is calculated at 5.14% if player doubles the main wager to play, and 1.58% if player triples the main wager to play.

TABLE 1

| TWO LETTER PLAYER'S HAND RATED AGAINST DEALER'S HAND | PAYOUT |
|---|---|
| PUSH, SAME RANKING | 0 TO 1 |
| ONE RANKING HIGHER | 8 TO 1 |
| TWO RANKINGS HIGHER | 15 TO 1 |
| THREE RANKINGS HIGHER | 50 TO 1 |
| FOUR RANKINGS HIGHER | 100 TO 1 |
| FIVE RANKINGS HIGHER | 500 TO 1 |
| DOUBLE/TRIPPLE | CA = 5.14%/1.58% |

HOUSE QUALIFIES TO PLAY IF "HOUSE HAND" IS RATED B OR HIGHER. PLAYER PLAYS IF DOUBLES OR TRIPPLES WAGER

When multi sets of entities are used, the method of play, Libraries, the payout schedule and the Casino Advantage could be different from the above. Also, if the dealer face up letter is Y or Z, then players may be offered an insurance bet that could pay 22 to 1, if dealer "Hand" ends with the wild combination Y & Z.

After the main wager is settled, the dealer places the House two entities in the stack. The fate of the player's first side bet is settled according to Table 2 below. Using the payouts given in Table 2, the Hit Frequency, HF, is calculated at 36% and the Casino Advantage, CA, is calculated at 2.46%.

TABLE 2

| | PLAYER'S TWO LETTER HAND | OUTCOME/PAYOUT TABLE SETUP | |
|---|---|---|---|
| A. | TWO CONSONANTS COMBINATIONS (BY AND MY ARE EXCLUDED) | 208 | −1/LOSS |
| B. | ONE VOWEL AND ONE CONSONANT, NOT AN ESTABLISHED WORD | 61 | 1 TO 1 |
| C. | AN ESTABLISHED WORD BUT NOT A NAME | 30 | 3 TO 2 |
| D. | AN ESTABLISHED NAME | 14 | 2 TO 1 |
| E. | TWO VOWELS | 10 | 3 TO 1 |
| F. | THE WILD WORDS BY OR MY | 2 | 10 TO 1 |
| G. | PLAYER'S INITIALS OR CHOICE OF ANY 2 LETTERS OR Y&Z | 1 | 15 TO 1 |
| | | TOTAL OF 325, HF = 36%, CA = 2.46% | |

In the second stage of the game, each player, whose 2 letter "Hand" in the first stage contains the letter Q or are the combination of the letters C and J, pushes on the second side bet and the round of play ends (since the pre-determined condition is not met). If the two letters "Hand" in the first stage do not contain the letter Q and are not the combination C and J, then player receives one more entity. The fate of the second side bet is associated with the player's 3 letter "Hand" value. The objective of the second stage of the game is to use all the three letter combination to fall within the best group rating, A to G. Player's "Hand" wins if it ranks C or better and loses if it ranks A or B. Using the ranking system and payout schedules of Table 3 below, HF is calculated at 29% and CA is calculated at 3.1%.

TABLE 3

| THREE LETTER HAND COMBINATIONS RATED FROM A TO G, WORST TO BETTER | OUTCOME/PAYOUT TABLE SETUP | |
|---|---|---|
| A & B | 1849 | −1/LOSS |
| ONE OF THE 2 LETTERS IS Q OR CJ COMBINATION | 324 | PUSH |
| C | 362 | 2 TO 1 |
| D | 43 | 8 TO 1 |
| E | 10 | 25 TO 1 |
| F | 10 | 25 TO 1 |
| G | 2 | 100 TO 1 |
| | TOTAL OF 3276 HF = 29%, CA = 3.1% | |

The round of the game continues until the last placed wager, or until the predetermined condition is not met.

Multi Players and Slot/Video Machine Electronic Setups

Instead of physical entities, a live dealer, hardcopies of Ranking systems, lists of combinations of letters and their classification into the Ranking system, method and rules of play used in social and table games setups, an apparatus that includes a display, stored libraries, method and rules of play and a computer processor are used to simulate and play the game "Wordy" in electronic setups.

The apparatus stores a large number of sets of the 26 alphabetic letters, Libraries of all possible "Hands" and "Outcomes", each library is associated with combinations of a fixed number of the alphabetic letters, includes a Ranking system that applies to each and all of the stored libraries, establishes electronic files associated with the stored libraries in which each "Hand" or "Outcome" is uniquely ranked within the established Ranking system.

The apparatus accepts wagers, and randomly selects and displays entities to form "Hands" or "Outcomes". The computer processor ranks and compares the "Hands" or "Outcomes" and establishes the fate of each wager in accordance to the methods of play and payouts schedules built in the computer. The following two preferred embodiments demonstrate the use of the apparatus in playing the game "Wordy".

One embodiment includes a multi player electronic setup system and a computerized processor, with a video display of a dealer surrounded by multiplayer positions and terminals. The processor has means to accept one main wager from at least one player, randomly selects and displays two entities to the or each player and to the "House". Player's letters are facing up whereas one of the House letter is facing down. The processor gives players the choice, after seeing the House face up letter, whether to lose the whole or a part of the main wager and not to play against the House, or to double (or triple) the main wager and to play against the House. The House qualifies to play against the players if the House's 2 letter "Hand" is ranked at a specified level or better. If the House is not qualified to play, House returns the main wager and all the adds-on to the player. If the House is qualified to play, then the processor compares the ranking of the House's "Hand" to the player's "Hand"; If the House's "Hand" rates higher than the player's "Hand", processor collects the player's main wager and the adds-on; if the House's "Hand" rates equally to the player's "Hand", it is a push, and if the House's "Hand" rates lower than the player's "Hand", processor pays the main wager and the adds-on in accordance to a built in payout schedule.

Another preferred embodiment is the use of a slot/video machine with R reels or columns, R=>3 and accepts W independent multi wagers, W=>2. Each reel or column has or can display all the alphabetic letters. After placing the said W wagers, player pushes the spin button which triggers the first two reels or columns to spin and display an "Outcome" of two alphabetic letters. This outcome is associated with and determines the fate of the first wager. When the Library and the Ranking system given in FIG. 7 are built in the said machine, the processor may collect and pay the first wager in accordance to the payout schedule given in Table 4 below. In that case, HF is calculated at 35% and CA is calculated at 4.8%.

TABLE 4

| RANK | OUTCOMES/PAYOUT | |
|---|---|---|
| A | 439 | −1/LOSS |
| B | 153 | 1 TO 2 |
| C | 32 | 2 TO 1 |
| D | 25 | 3 TO 1 |
| E | 25 | 4 TO 1 |
| F | 2 | 20 TO 1 |
| G | 1 | 50 TO 1 |
| | TOTAL OF 676, HF = 35% CA = 4.8% | |

The processor checks if the two letter "Outcome" of the spin of the first two reels, meets the predetermined condition to automatically activate and spin the third reel and displays a third letter to form a 3 letter "Outcome". If the predetermined condition is met, then instantly and automatically the third reel will spin and display a third letter. The 3 letter "Outcome" is associated with and determines the fate of the second wager. If the condition is not met, then the processor will credit back to the player a portion of the second wager and all the wagers placed after the second wager, if any, and the game ends. If the predetermined condition for the third reel to spin is to have a chance to get a winning 3 letter "Outcome", then the processor will use the Libraries and the Ranking system given in FIG. 11 to determine the fate of the second wager. If the pre-determined condition is met, the processor collects and pays the second wager in accordance to the payout schedule given in Table 5 below. The Casino Advantage is 3.9%.

TABLE 5

| RANKING | OUTCOME/PAYOUT | |
|---|---|---|
| A + B | 5,035 | −1/LOSS |
| Condition not met | 11,232 | −0.5/half wager loss |
| C | 966 | 3 TO 1 |
| D | 185 | 12 TO 1 |
| E | 125 | 15 TO 1 |
| F | 33 | 60 TO 1 |
| G | 1 | 1000 TO 1 |
| | TOTAL OF 17576 CA = 3.9% | |

The process continues until the last placed wager or until the condition is not met.

Table 6 below provides 18 samples runs of a machine with 4 reels, one winning line, 2 or 3 wagers, each wager $1, $3, $5 or $10. When the condition is not met, the machine processor returns 50% of the second wager back to the player. As contemplated from Table 6, players can potentially win a Mini jackpot (when the payout is about 10 to 1), Minor Jackpot (when the payout is about 100 to 1), a Major Jackpot (when the payout is about 1,000 to 1), a Grand Jackpot (when the payout is about 10,000 to 1), and a Super Jackpot (the payout is about 100,000 to 1).

TABLE 6

| SPIN | WAGERS PLACED, $ | | | 1ST WAGER 2 REELS | | | |
|---|---|---|---|---|---|---|---|
| # | 1ST | 2ND | 3RD | OUTCOME | RANK | FATE | RETURN |
| 1 | 3 | 5 | — | FO | B | WINS 1 TO 2 | $4.50 |
| 2 | 5 | 3 | 3 | BI | C | WINS 2 TO 1 | $15 |
| 3 | 10 | 3 | 1 | BY | F | WINS 20 TO 1 | $210 |
| 4 | 10 | 3 | 5 | SI | G | WINS 50 TO 1 | $510 |
| | | | | MINOR JACKPOT WINNER | | | |
| 5 | 1 | 5 | — | RO | D | WINS 3 TO 1 | $4 |
| 6 | 3 | 5 | 5 | LO | D | WINS 3 TO 1 | $12 |
| 7 | 1 | 5 | 1 | AI | E | WINS 4 TO 1 | $5 |
| 8 | 5 | 3 | 10 | DO | C | WINS 2 TO 1 | $15 |
| 9 | 3 | 3 | 5 | QU | B | WINS 1 TO 2 | $4.5 |
| 10 | 1 | 1 | 1 | PL | A | LOSS OF &1 | |
| 11 | 5 | 1 | 10 | CL | A | LOSS OF &5 | |
| 12 | 1 | 1 | 10 | PL | A | LOSS OF &1 | |
| 13 | 5 | 1 | — | PL | A | LOSS OF &5 | |
| 14 | 3 | 3 | 3 | PL | A | LOSS OF &3 | |
| 15 | 10 | 3 | 3 | FL | A | LOSS OF &10 | |
| 16 | 3 | 10 | 10 | SH | A | LOSS OF &3 | |
| 17 | 5 | 5 | — | GY | A | LOSS OF &5 | |
| 18 | 1 | 10 | 3 | BN | A | LOSS OF &1 | |

TABLE 6-continued

| | | | 2ND WAGER | | |
|---|---|---|---|---|---|
| SPIN # | 3 REELS OUTCOME | RANK | FATE | RETURN | 3RD WAGER |
| 1 | FOY | D | WINS 12 TO 1 | $65 | E - NO WAGER PLACED |
| 2 | BIT | C | WINS 4 TO 1 | $15 | BITJ LOSS $3 |
| 3 | BYE | C | WINS 4 TO 1 | $15 | R - CONDITION NOT MET $0.5 RETURN |
| 4 | SIN | G | WINS 1000 TO 1 | $3003 | SINA RANK G $50,005 |
| | | | MAJOR JACKPOT WINNER | | SUPER JACKPOT WINNER |
| 5 | ROL | B | LOSS OF $5 | | E - NO WAGER PLACED |
| 6 | LOA | B | LOSS OF $5 | | LOAA LOSS $5 |
| 7 | AIZ | B | LOSS OF $5 | | R - CONDITION NOT MET $0.5 RETURN |
| 8 | DOO | B | LOSS OF $3 | | DOOR WINS C $40 |
| 9 | R - CONDITION NOT MET | | R $3 CREDITED BACK | | R $5 CREDITED BACK |
| 10 | PLO | | LOSS OF $1 | | PLOX LOSS OF $1 |
| 11 | CLA | | LOSS OF $1 | | CLAY RANKS D $130 |
| 12 | PLX | | LOSS OF $1 | | R - CONDITION NOT MET $5 RETURN |
| 13 | PLO | | LOSS OF $1 | | E - NO WAGER PLACED |
| 14 | PLY | F | WINS 20 TO 1 | $63 | PLYY LOSS OF $3 |
| 15 | FLU | D | WINS 12 TO 1 | $39 | FLUE RANKS D $39 |
| 16 | SHY | F | WINS 100 TO 1 | $1010 | R - CONDITION NOT MET $5 RETURN |
| 17 | GYM | F | WINS 100 TO 1 | $505 | E - NO WAGER PLACED |
| 18 | R - CONDITION NOT MET | | R $10 CREDITED BACK | | R $3 CREDITED BACK |

The invention claimed is:

1. A gaming system, comprising:

a deck of at least 26 physical playing cards, each card having a face side that bears a different letter of the alphabet, including 21 consonants and 5 vowels, and wherein at least one player receives L cards out of S decks; and a ranking system, wherein the combinations of the letters of the at least one player L cards are compared to all the different combinations of L letters that can be formed out of the S decks within seven categories, G to A, highest to lowest, representing combinations of L letters listed and stored in seven libraries G (S,L) to A (S,L), as follows:

category G: a unique pre-determined combination of letters and/or player's choice of a combination of letters, drawn from all possible combinations of letters listed in libraries G (S,L) to A (S,L);

category F: combinations of consonants only and which form an established word, as listed in library F (S,L);

category E: combinations of vowels only, as listed in library E (S,L);

category D: combinations of letters that form an established name, as listed in library D (S,L);

category C: combinations of letters including at least one vowel and which form an established word, as listed in library C (S,L);

category B: combinations of letters including at least one vowel, unlisted in library C (S,L), D (S,L) or E (S,L), as listed in library B (S,L); and category A: combinations of consonants only, unlisted in library D (S,L) or F (S,L), as listed in library A (S,L); and wherein the combinations within each category G to A may be re-ranked in accordance to the order of the alphabetic letters that form the combinations.

2. The gaming system of claim 1 involving at least two players competing against each other or others during a round of play in a game, whereas each of the at least two players receives randomly one or more cards to form a hand, and whereas each of the at least two players has the option to replace one or more of their cards and stop the round of play by calling it.

3. The gaming system of claim 2 whereas a winner is declared after the players hands are exposed and compared.

4. The gaming system of claim 1 involving a dealer for a house conducting a game and at least one player, whereas the at least one player makes a main wager against the house, dealing randomly one or more cards to each of the at least one player and to the house to form at least one player hand and a house hand, comparing the hand ranking of each of the at least one player with the house hand ranking, and settling the main wager in accordance to a predetermined payout schedule.

5. The gaming system of claim 4 whereas the house qualifies to play if the house hand ranking is ranked at a specified ranking or higher.

6. The gaming system of claim 5 whereas Lis equal to 2 and S is equal to 1, and house qualifies if house hand is ranked B or higher.

7. The gaming system of claim 1 involving at least one player in a game, whereas the at least one player makes a first side wager to play, and receives randomly one or more cards to form a first hand, and the first side wager is settled in accordance to a predetermined payout schedule.

8. The gaming system of claim 7 whereas a single deck of cards is used, and each hand has two cards.

9. The gaming system of claim 7 whereas the at least one player makes a second side wager to play in the game and receives one or more additional cards to form a second hand associated with the second side wager, and the second hands are settled in accordance to a predetermined payout schedule.

10. The gaming system of claim 9 whereas an existing pre-determined condition is that a player's first hand must be met to receive the one or more additional cards.

11. The gaming system of claim 10 whereas the predetermined condition receiving one or more cards is that the player has a chance to form a second hand ranking at a specified ranking or higher.

12. The gaming system of claim 11 whereas a single deck of cards is used, the first hand comprises two cards, each player receives an additional single card to form a 3-letter hand, the specified ranking is B, and the second side wager is settled in accordance to a predetermined payout schedule.

13. A gaming machine, comprising:

a display, a data processor implementing a random number generator;

a database storing libraries with a plurality of sets, each set comprising at least 26 letters of the alphabet, the letters including 21 consonants and 5 vowels;

a user-operable trigger causing the data processor to randomly select and display in sequence one or more of the letters (L) to form an outcome; and wherein the data processor is programmed to apply a ranking system to the sequence upon activation of the trigger, the ranking system including the following operations:

randomly selecting and displaying a permutation of one or more letters in sequence to form an outcome;

comparing the outcome of the letters to all the possible outcomes of L letters that can be formed within seven categories, G to A, higher to lowest, representing combinations or permutations of letters listed and stored in seven libraries G (L) to A (L) as follows:

category G: a unique pre-determined outcome of letters and/or participant's choice of an outcome from all possible outcomes listed in libraries G (L) to A (L);

category F: outcomes of consonants only and which form an established word, as listed in library F (L);

category E: outcomes of vowels only, as listed in library E (L);

category D: outcomes of letters that form an established name, as listed in library D (L);

category C: outcomes of letters including at least one vowel and which form an established word, as listed in library C (L);

category B: outcomes of letters including at least one vowel, unlisted in library C (L), D (L) or E (L), as listed in library B (L);

category A: outcomes of consonants only, unlisted in library D (L) or F (L), as listed in library A (L); and wherein the outcomes within each category A to G are re-ranked, lowest to highest, in accordance to the order of the alphabetic letters that form the outcomes.

14. The gaming machine of claim 13, whereas the processor is further operative to perform the following functions:

accept one main wager from at least one player to play a game;

select and display one or more letters to the at least one player and to a house conducting the game;

compare an outcome ranking of the at least one player to a house outcome ranking; and settle the main wager in accordance to a predetermined payout schedule.

15. The gaming machine of claim 14, whereas the house qualifies to play if the house outcome is ranked at a specified ranking or higher.

16. The gaming machine of claim 15 whereas L is equal to 2 and the specified ranking is B.

17. The gaming machine of claim 13 whereas the processor accepts a first side wager to play in a game, and the first side wager is settled in accordance to a predetermined payout schedule.

18. The gaming machine of claim 17 whereas each outcome comprises two letters.

19. The gaming machine of claim 17 whereas the processor accepts a second side wager to play from at least one player in communication with the processor, selects and displays in sequence one or more additional letters to form a second combined outcome associated with the second side wager, and the second side wager is settled in accordance to a predetermined payout schedule.

20. The gaming machine of claim 19 whereas an existing predetermined condition is that a first outcome must be met in order to display in sequence the one or more additional letters.

21. The gaming machine of claim 20 whereas the existing pre-determined condition on the first outcome is by displaying the one or more additional letters, to get a second combined outcome with a chance to rank at a specified ranking or higher.

22. The gaming machine of claim 21 whereas the processor first selects and displays two letters followed by selecting and displaying one additional letter only if there is a chance to form a 3-letter combined outcome ranking B or higher, and the second side wager is settled in accordance to a predetermined payout schedule.

* * * * *